United States Patent
Wippler

(10) Patent No.: US 9,919,555 B2
(45) Date of Patent: Mar. 20, 2018

(54) ADAPTABLE WHEEL ASSEMBLY

(71) Applicant: Toyota Motor Engineering & Manufacturing North America, Inc., Erlanger, KY (US)

(72) Inventor: Erik Anthony Wippler, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 163 days.

(21) Appl. No.: 14/823,742

(22) Filed: Aug. 11, 2015

(65) Prior Publication Data

US 2017/0043616 A1  Feb. 16, 2017

(51) Int. Cl.
| | |
|---|---|
| *B60B 19/00* | (2006.01) |
| *B60B 3/00* | (2006.01) |
| *B60B 3/10* | (2006.01) |
| *B60B 7/00* | (2006.01) |
| *B60B 7/04* | (2006.01) |
| *B60B 7/06* | (2006.01) |

(Continued)

(52) U.S. Cl.
CPC ............. *B60B 3/007* (2013.01); *B60B 3/10* (2013.01); *B60B 7/0086* (2013.01); *B60B 7/04* (2013.01); *B60B 7/065* (2013.01); *B60B 19/10* (2013.01); *B60B 1/06* (2013.01); *B60B 2900/1216* (2013.01); *B60B 2900/513* (2013.01); *Y02T 10/88* (2013.01)

(58) Field of Classification Search
CPC ......... B60B 3/007; B60B 3/10; B60B 7/0086; B60B 7/065; B60B 19/10; B60B 7/04; B60B 2900/1216; B60B 1/06

USPC ........ 301/37.25, 43, 45, 48, 37.101, 37.102, 301/37.108

See application file for complete search history.

(56) References Cited

U.S. PATENT DOCUMENTS 4,593,953 A * 6/1986 Baba .................... B60B 7/00
                                                    301/37.101
7,661,766 B2   2/2010 Davis et al.
(Continued)

FOREIGN PATENT DOCUMENTS

DE         2341967 A1    3/1975
DE   10 2011 121 311 A1  6/2013
(Continued)

*Primary Examiner* — S. Joseph Morano
*Assistant Examiner* — Jean W Charleston
(74) *Attorney, Agent, or Firm* — Dinsmore & Shohl LLP

(57) ABSTRACT

A wheel assembly for use in an automotive vehicle is provided. The wheel assembly is configured to improve the aerodynamics of the moving automotive vehicle yet maintain the aesthetic appearance of a spoked wheel. The wheel assembly includes a plurality of spokes extending radially from the hub and interconnected to the rim. The spokes spaced apart from each other so as to define a plurality of openings, giving the wheel an aesthetic look. The spokes having a first part operatively connected to a second part. The wheel assembly includes an actuator mechanically attached to each of the plurality of spokes. The actuator is configured to move the first part with respect to the second part so as to cover each of the plurality of openings and form a generally solid disk when the wheel assembly reaches a predetermined speed so as to improve the aerodynamics of the wheel assembly.

16 Claims, 7 Drawing Sheets

(51) Int. Cl.
    *B60B 19/10*     (2006.01)
    *B60B 1/06*     (2006.01)

(56) References Cited

U.S. PATENT DOCUMENTS

| | | | |
|---|---|---|---|
| 7,681,942 | B2 | 3/2010 | Van Der Westhuizen |
| 8,082,788 | B1 * | 12/2011 | Fu .................... G01L 1/2218 |
| | | | 73/504.03 |
| 8,424,956 | B2 | 4/2013 | Stimel |
| 8,517,474 | B2 | 8/2013 | Salah |
| 8,632,135 | B2 * | 1/2014 | Miansian ................ B60B 1/14 |
| | | | 301/37.25 |
| 8,801,107 | B2 | 8/2014 | Schmid et al. |
| 8,857,921 | B2 | 10/2014 | Schmid et al. |
| 2007/0246996 | A1 | 10/2007 | Footit |
| 2008/0036285 | A1 * | 2/2008 | Davis ................ B60B 7/0066 |
| | | | 301/37.25 |
| 2009/0195053 | A1 | 8/2009 | Kruse et al. |
| 2011/0008019 | A1 | 1/2011 | Hirano |
| 2013/0096781 | A1 | 4/2013 | Reichenbach et al. |
| 2015/0069822 | A1 * | 3/2015 | Haase ................... B60B 7/00 |
| | | | 301/37.101 |

FOREIGN PATENT DOCUMENTS

| | | |
|---|---|---|
| FR | 2 989 024 A1 | 10/2013 |
| JP | 2010-064582 A | 3/2010 |
| JP | 2011-195038 A | 10/2011 |
| WO | 2003/084769 A1 | 10/2003 |
| WO | 2008/066502 A2 | 6/2008 |
| WO | 2014/145565 A1 | 9/2014 |

* cited by examiner

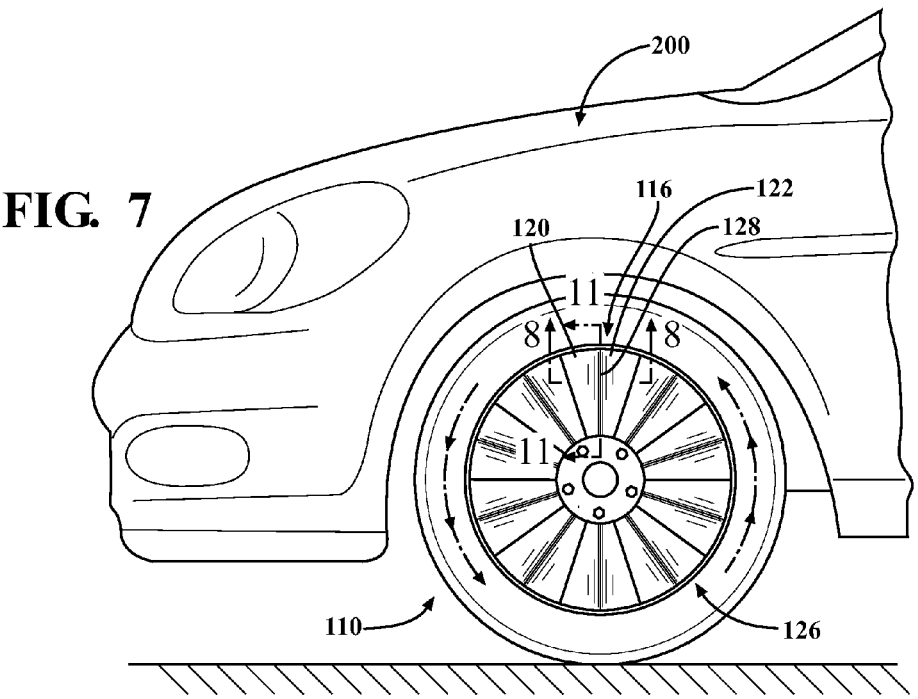
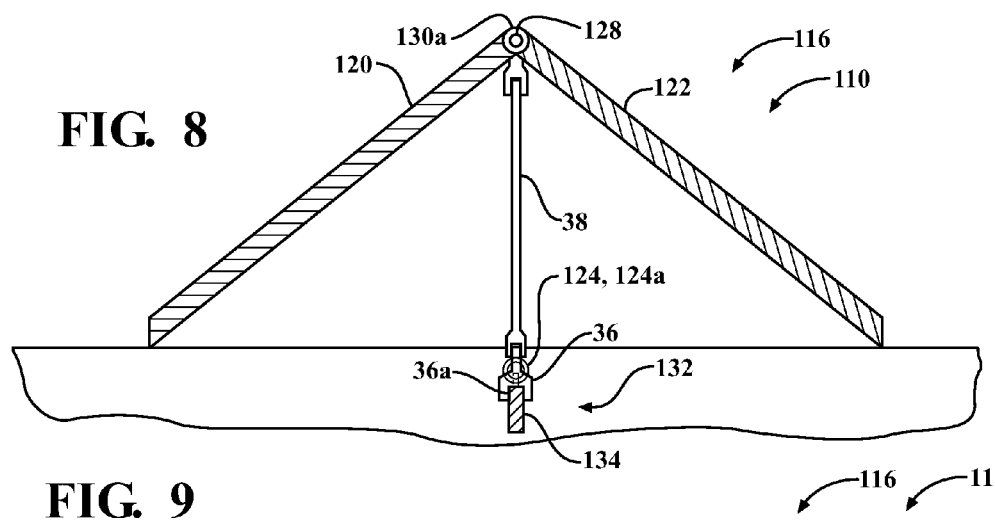
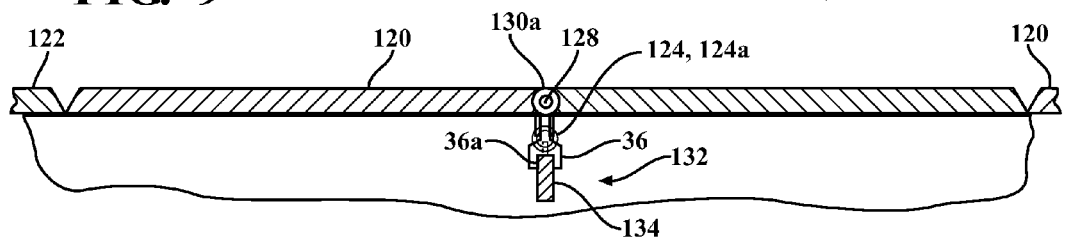

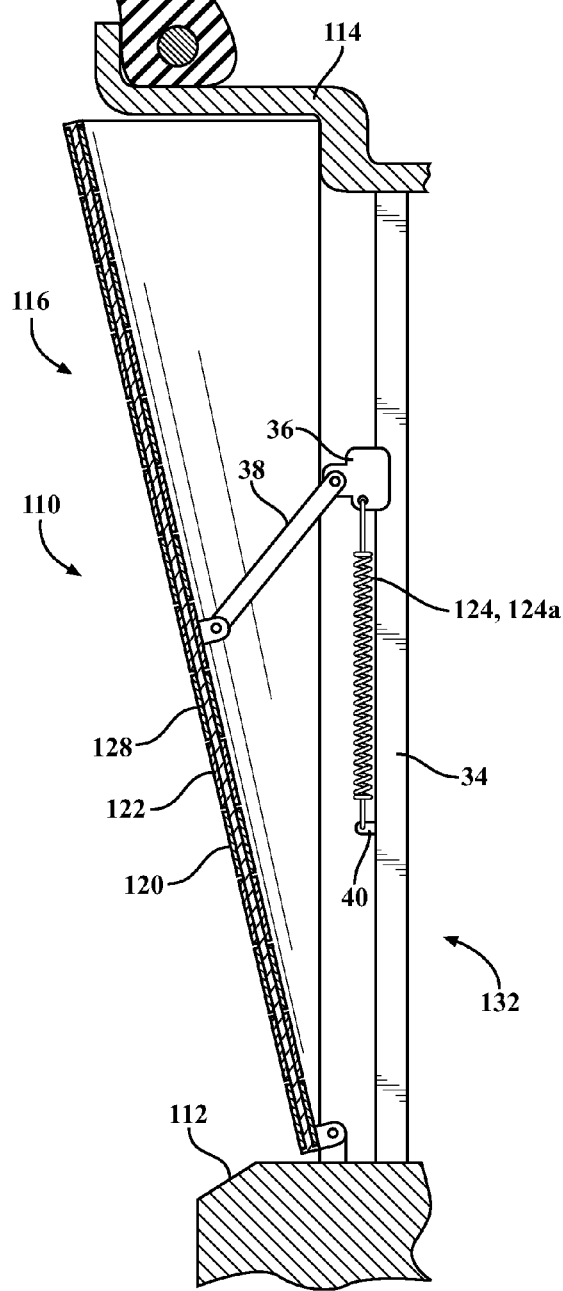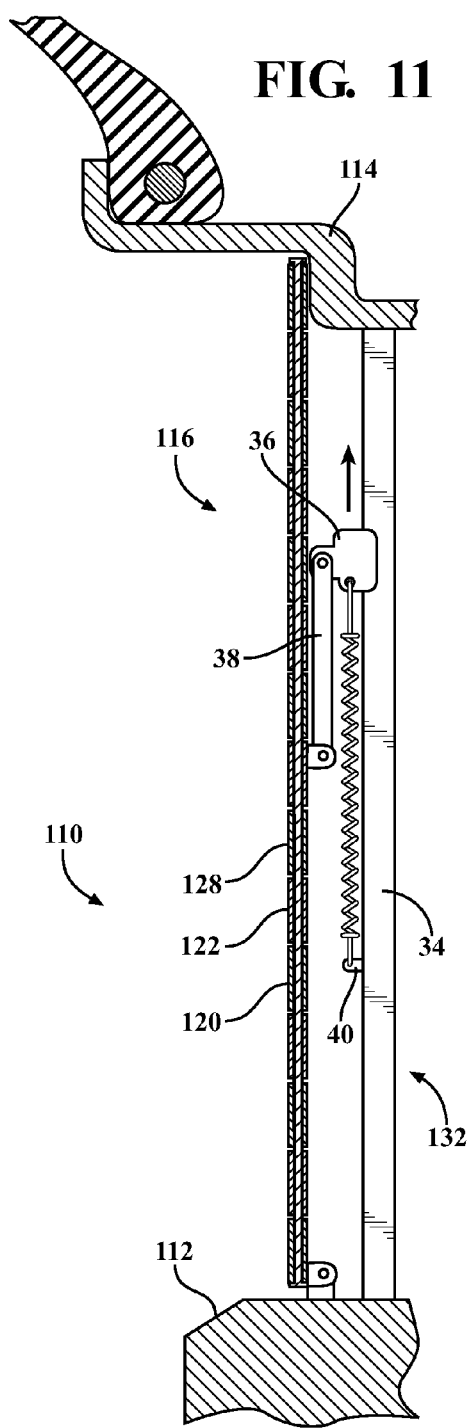

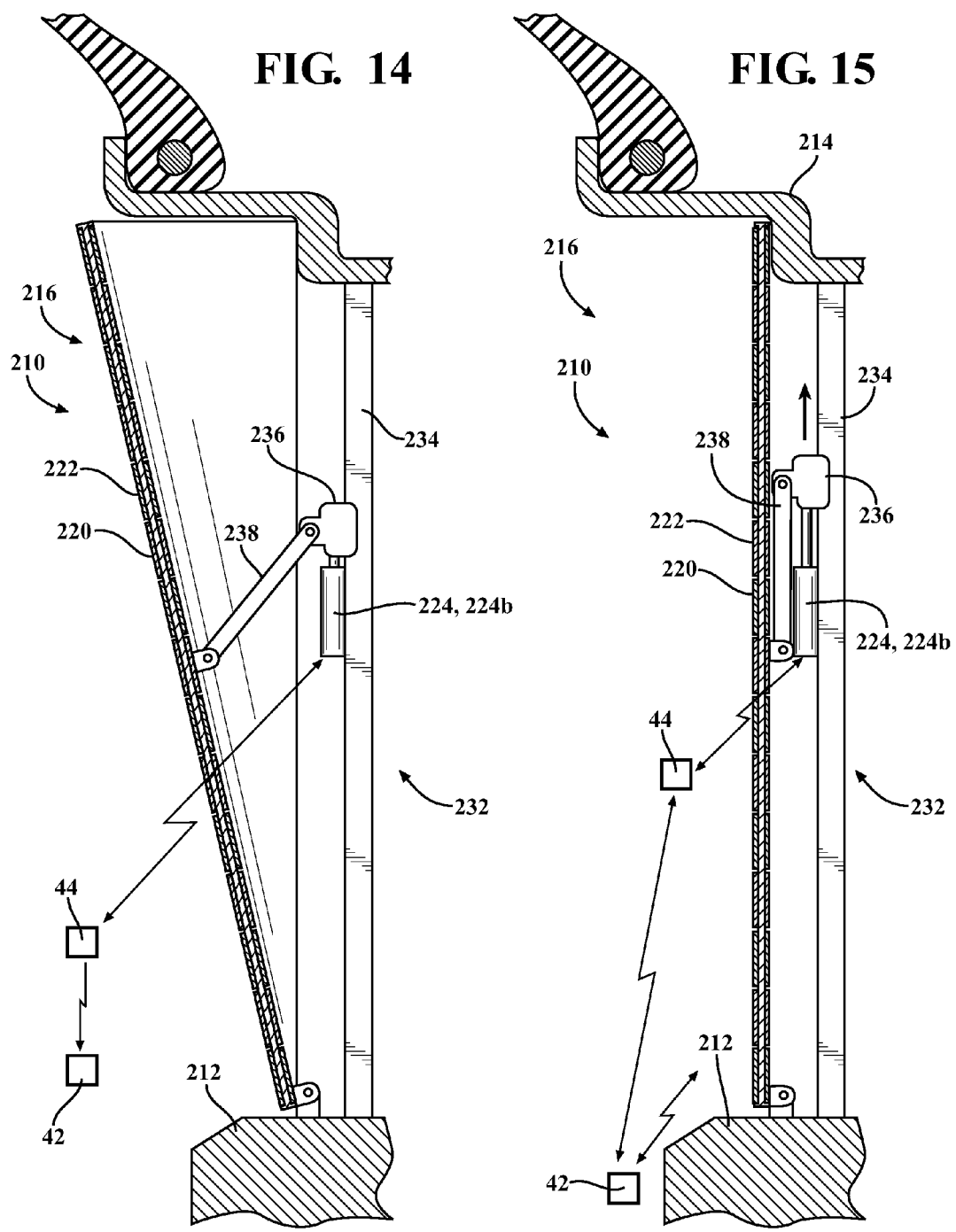

ADAPTABLE WHEEL ASSEMBLY

FIELD OF THE INVENTION

A wheel assembly configured to improve aerodynamics is provided. In particular, the wheel assembly includes a plurality of spokes and an actuator configured to move the spokes so as to cover the openings and form a generally solid disk.

BACKGROUND OF THE INVENTION

Often consumers are left with choosing between aesthetics and fuel efficiency. For instance, many consumers prefer the look of a wheel with spokes. The spokes increase vehicle drag and thus decrease fuel efficiency with respect to a wheel with a hub having a solid disk. In particular, air flows into the opening between the spokes which creates drag, as opposed to a construction where the wheels have a solid disk bound by a respective rim. The disk increases aerodynamics relative to the spokes as air flows over the disk. However, the spokes are not seen individually when the automotive vehicle reaches a predetermined speed, as the rotation of the spokes cause them to blur together.

Accordingly, it remains desirable to have a wheel assembly with the aesthetic appeal of the spokes yet has the aerodynamics of a sold disk. In particular it remains desirable to have a wheel assembly where the spokes are seen when the automotive vehicle is travelling below a predetermined speed or stopped, but automatically transforms into a solid disk when the automotive vehicle is travelling above a predetermined speed so as to increase the aerodynamics of the automotive vehicle.

SUMMARY OF THE INVENTION

A wheel assembly for use in an automotive vehicle is provided. The wheel assembly is configured to improve the aerodynamics of the moving automotive vehicle yet maintain the aesthetic appearance of a spoked wheel. The wheel assembly includes a plurality of spokes extending radially from the hub to the rim. The spokes are spaced apart from each other so as to define a plurality of openings, giving the wheel an aesthetic look when stationary or moving below a predetermined speed. The spokes have a first part operatively connected to a second part.

The wheel assembly includes an actuator mechanically attached to each of the spokes. The actuator is configured to move the first part with respect to the second part so as to cover each of the plurality of opening, forming a generally solid disk when the wheel assembly reaches a predetermined speed so as to improve the aerodynamics of the wheel assembly.

The first part and the second part are planar members, and are pivotably connected to each other. The first part is angled with respect to the second part so as to form a generally "V" shaped cross-section. The actuator is configured to move the first part with respect to the second part so as to cover each of the openings and form a generally solid disk when the wheel assembly reaches a predetermined speed. Accordingly, the wheel assembly improves the aerodynamics of a wheel assembly having fixed spokes, but maintains the aesthetic look of the spokes.

The first part and the second part each include a distal end opposite from a proximal end and an inner side edge opposite from an outer side edge. The inner side edge and the outer side edge extend between the distal and proximal ends so as to form an isosceles trapezoid shape. The distal end of the first part and second part are disposed adjacent the hub. The inner side edge of the first part is pivotably coupled to the inner side edge of the second part. The actuator is configured to urge the outer side edge of the first member towards the outer side edge of the second member.

According to one aspect assembly, the actuator is a biasing member. The biasing member is disposed between a plurality of elongated supports and the first and second parts of the spoke. A support rod provides a common axis for which the first and second part pivot. The first part and the second part include a sleeve disposed along the respective inner side edges. The sleeves are mounted to the support rod so as to allow the first part to pivot with respect to the second part about the respective on of the plurality of support rods.

The elongated support extends radially from the base and is disposed underneath the support rod. The biasing member is disposed between the elongated support and the support rod so as to continuously urge the first and second part upwardly, maintaining the spatial dimensions of the openings. When the wheel is turned, centrifugal force urges the first and the second parts to slide away from each other, spreading the outer sides of the first and second parts towards each other until they abut against each other and the openings are closed.

According to another aspect of the wheel assembly, the wheel assembly includes a base. The base includes a plurality of elongated supports extending radially from the hub. A carriage is slidably mounted to the base. The wheel assembly further includes a link having a first end pivotably attached to the inner side edge of both the first and second parts and a second end pivotably attached to the carriage. The biasing member is configured to continuously pull the carriage towards the hub. The centrifugal force of the rotating wheel assembly urges the carriage away from the hub so as to move the outer side edges of the first and second part towards each other, spreading the outer sides of the first and second parts towards each other until they abut against each other, closing the openings.

In yet another aspect of the wheel assembly, the wheel assembly includes a sensor and a controller. The sensor is configured to detect the relative speed of the wheel assembly. The controller is configured to actuate the servo motor so as to move the outer side edges of the first and second part towards each other when the relative speed of the wheel assembly reaches a predetermined speed. The controller is further configured to move the outer side edges of the first and second part away from each other when the speed of the wheel assembly is below the predetermined speed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

FIG. 7 is a perspective view according to one aspect of the wheel assembly showing the spokes closing the openings;

FIG. 8 is a cross-sectional view of FIG. 6 taken along lines 8-8;

FIG. 9 is a cross-sectional view of FIG. 7 taken along lines 9-9;

FIG. 10 is a cross-sectional view of FIG. 6 taken along lines 10-10;

FIG. 11 is a cross-sectional view of FIG. 7 taken along lines 11-11;

FIG. 14 is a cross-sectional view of FIG. 12 taken along lines 14-14; and

FIG. 15 is a cross-sectional view of FIG. 13 taken along lines 15-15.

DETAILED DESCRIPTION OF THE PREFERRED EMBODIMENTS

Figure 1:
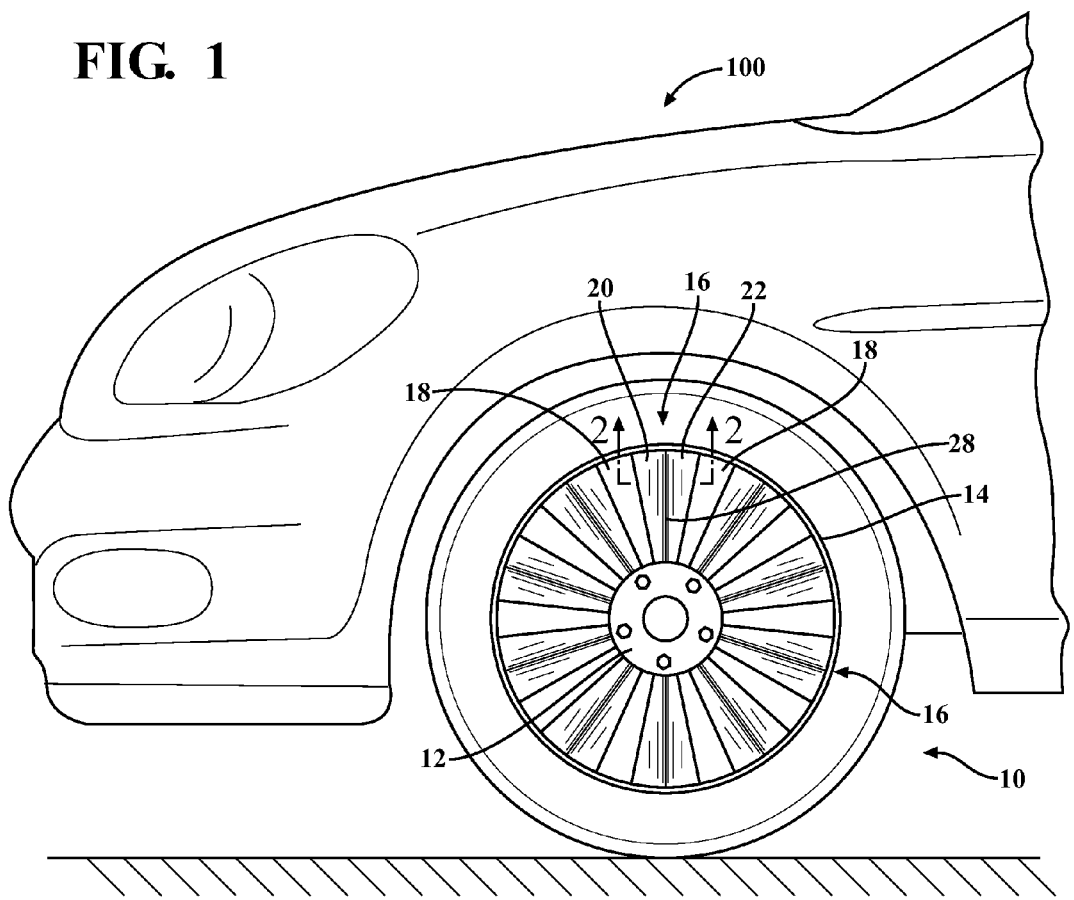
FIG. 1 is a perspective view showing the wheel assembly with openings between the spokes.

A wheel assembly configured to improve the aerodynamics of the moving automotive vehicle yet maintain the aesthetic appearance of a spoked wheel is provided. The wheel assembly includes a plurality of spokes extending radially from the hub and to the rim. The spokes are spaced apart from each other so as to define a plurality of openings, giving the wheel an aesthetic look.

The spokes are configured to spread towards each other so as to close the openings when the wheel assembly is subjected to a predetermined centrifugal force, relative speed or air pressure. The spokes have a first part operatively connected to a second part. The wheel assembly includes an actuator mechanically attached to each of the plurality of spokes. The actuator is configured to move the first part with respect to the second part so as to cover each of the plurality of openings and form a generally solid disk when the wheel assembly reaches a predetermined speed so as to improve the aerodynamics of the wheel assembly.

With reference now to FIGS. 1-4, an illustrative view according to one aspect of the wheel assembly 10 is provided. The wheel assembly 10 is shown operatively connected to the axle of an automotive vehicle 100. The wheel assembly 10 includes a hub 12 and a rim 14. The rim 14 is concentric to the hub 12. A plurality of spokes 16 extend radially from the hub 12 and to the rim 14. It should be appreciated that the number of spokes 16 are provided herein for illustrative purposes and is not limiting to the scope of the appended claims. Each of the spokes 16 are spaced apart from each other so as to define a plurality of openings 18. Each of the spokes 16 have a first part 20 operatively connected to a second part 22.

Figure 2:
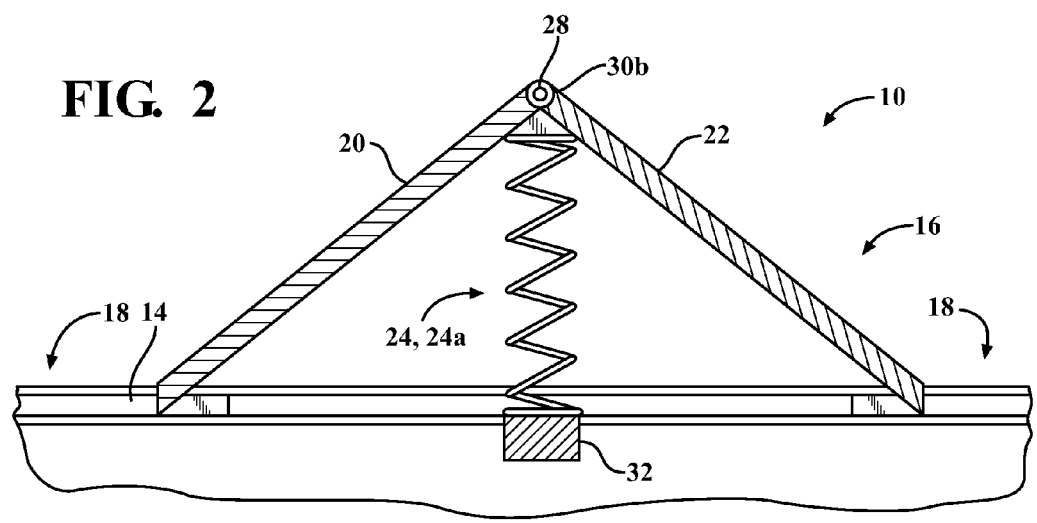
FIG. 2 is a cross-sectional view of FIG. 1 taken along lines 2-2.
Figure 4:
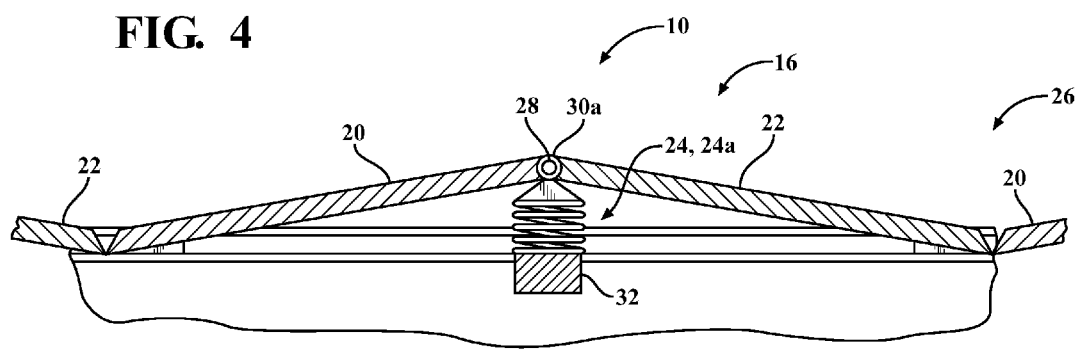
FIG. 4 is a cross-sectional view of FIG. 3 taken along lines 4-4.

With reference now to FIGS. 2 and 4, the wheel assembly 10 further includes a plurality of actuators 24, each actuator 24 is mechanically attached to a respective spoke 16. The actuators 24 are disposed underneath the spokes 16. The actuators 24 are configured to move the first part 20 with respect to the second part 22 so as to cover each of the plurality of openings 18 and form a generally solid disk 26 when the wheel assembly 10 reaches a predetermined speed so as to improve the aerodynamics of the wheel assembly 10. In other words, the actuators 24 spread the spokes 16 out so as to eliminate the openings 18, thus forming a solid disk 26 which increases aerodynamics relative to wheel assemblies with openings 18. FIG. 2 shows the wheel assembly 10 in an open position wherein the openings are open. FIG. 4 shows the wheel assembly 10 in a closed position wherein the wheel assembly 10 forms a solid disk 26 by having the first and second parts 20, 22 pushed against each other closing the openings 18.

Figure 5:
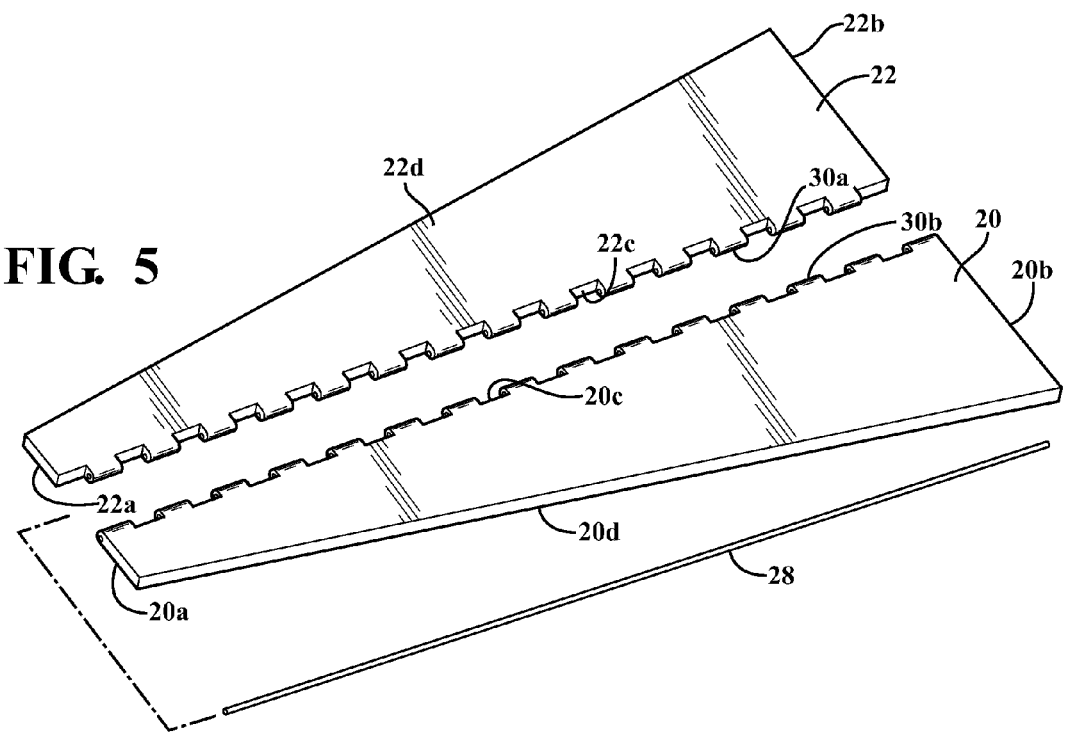
FIG. 5 is an isolated view showing the first part, second part and the support rod
Figure 6:
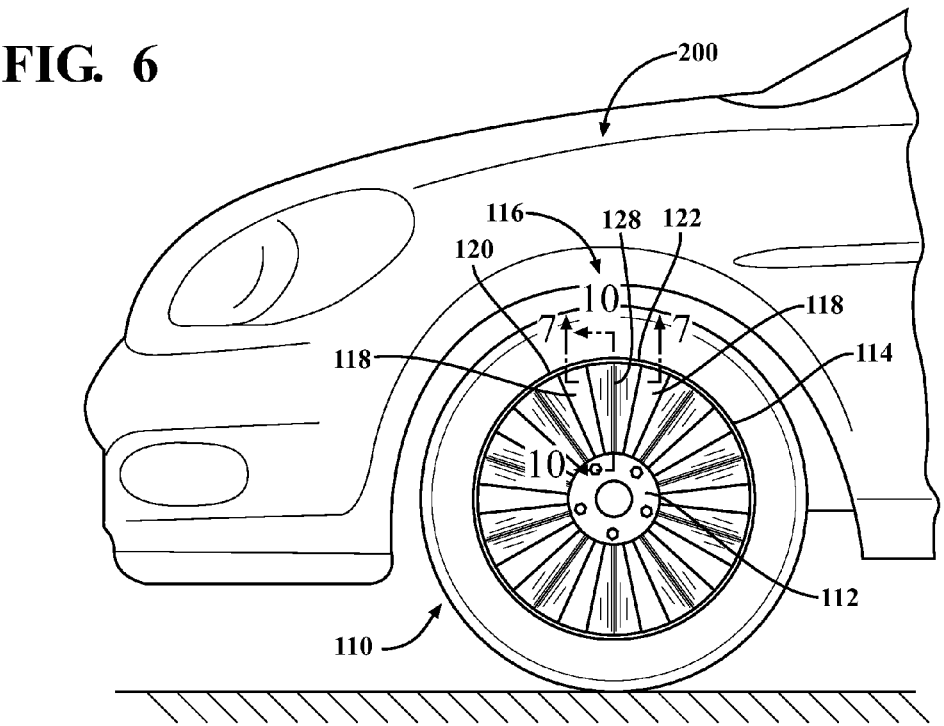
FIG. 6 is a perspective view according to one aspect of the wheel assembly showing the openings between the spokes.
Figure 12:
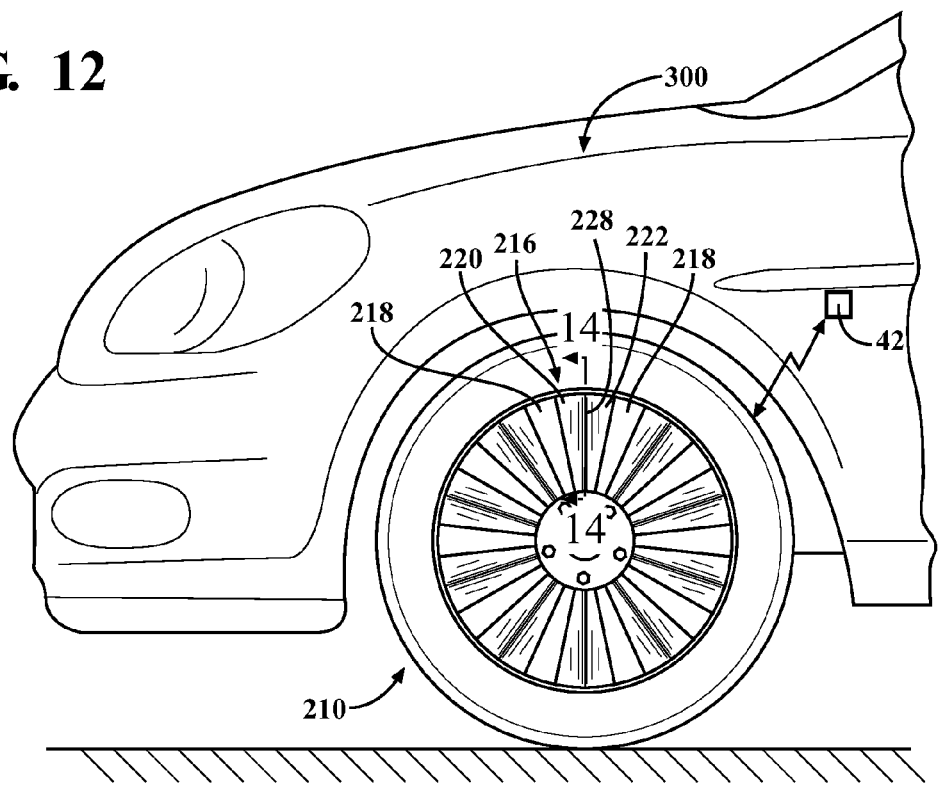
FIG. 12 is a perspective view according to yet another aspect of the wheel assembly showing the openings between the spokes.
Figure 13:
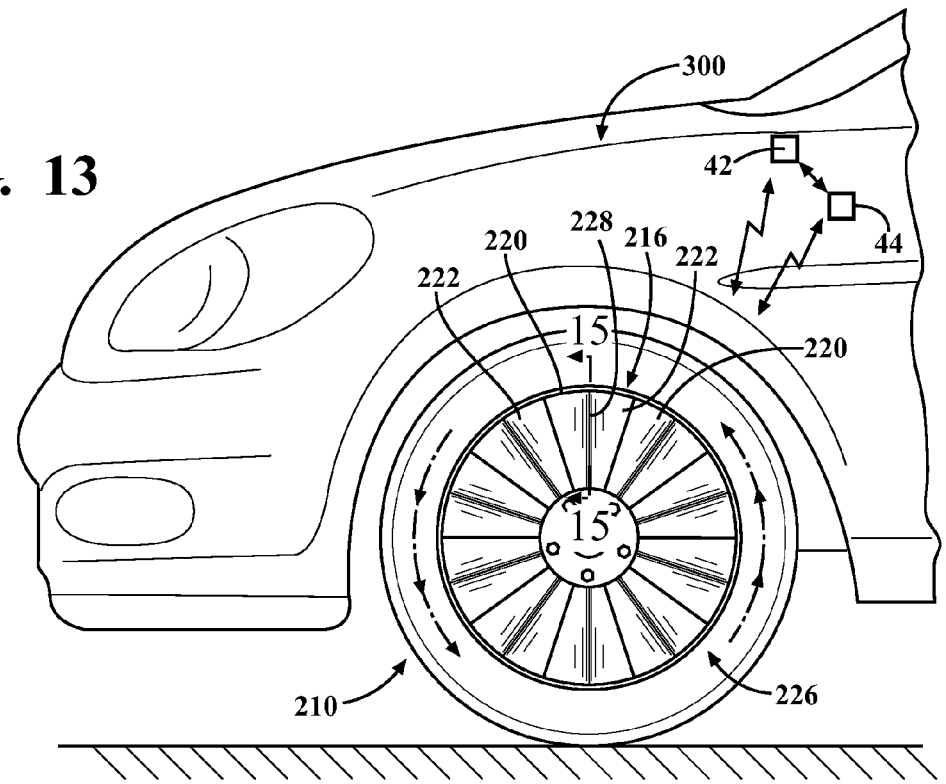
FIG. 13 is a perspective view according to yet another aspect of the wheel assembly showing the spokes closing the openings.

With reference now to FIG. 5, an exemplary illustration of the first and second parts 20, 22 are provided. The spokes 16 are movable from a first position (shown in FIGS. 1, 2, 5, 7, 10, 12, 14 and 16) to a second position (shown in FIGS. 3, 4, 6, 8, 11, 13, 15 and 17). The first part 20 is a planar member and the second part 22 is a planar member. The first part 20 is pivotably connected to the second part 22 and the first part 20 is angled with respect to the second part 22 so as to form a generally "V" shaped cross-section. A support rod 28 pivotably couples the first part 20 with respect to the second part 22. The first part 20 and the second part 22 include a sleeve 30a, 30b disposed along the inner side edge 20c, 22c of the respective first and second parts 20, 22.

With reference again to FIGS. 1 and 2, the spoke 16 is shown in the first position wherein the first and second parts 20, 22 are positioned with respect to each other to form the "V" shaped cross-section. FIGS. 1 and 2 also shows the openings 18 disposed between the spokes 16. It should be appreciated that in the first position, the spokes 16 are maximally displaced from each other such that the openings 18 are at their largest dimension.

With reference again to FIGS. 3 and 4, the spokes 16 are shown in the second position. In the second position the first and second parts 20, 22 are flattened so as to close the plurality of openings 18 and form a generally solid disk 26 when the wheel assembly 10 reaches a predetermined speed. Accordingly, the wheel assembly 10 improves the aerodynamics of a wheel assembly 10 having fixed spokes 16, but maintains the aesthetic look of the spokes 16.

With reference again to FIGS. 1 and 5, the first part 20 and the second part 22 each include a distal end 20a, 22a opposite a proximal end 20b, 22b, and an inner side edge 20c, 22c opposite of an outer side edge 20d, 22d and extending between respective distal and proximal ends 20a, 22a, 20b, 22b so as to define an isosceles trapezoid. The distal end 20a, 22a of the first part 20 and second part 22 are disposed adjacent the hub 12. The first and second parts 20, 22 are pivotably connected to each other along the inner side edge 20c, 22c of the first part 20 and the second part 22. The actuator 24 is configured to urge the outer side edge 20d of the first part 20 towards the outer side edge 22d of the second part 22.

With reference again to FIGS. 2 and 4, the actuator 24 is shown as a biasing member 24a. In particular, the biasing member 24 is a helical spring 24a. However, it should be appreciated that other biasing members currently known and used the art may be adapted for use herein, illustratively including a coil spring, an elastic band, or the like.

FIGS. 1-4 show a plurality of support rods 28 extending radially from the hub 12. The first part 20 and the second part 22 include a sleeve 30 disposed along the inner side edge 20c, 22c of the respective first and second parts 20, 22. The sleeves 30 are mounted to a respective support rod 28 so as to form a hinge. The support rods 28 provides a common axis for which first part 20 may pivot with respect to the second part 22.

The wheel assembly 10 may further include a plurality of bases 32. The each base 32 may be fixedly mounted to the rim 14. The biasing member 24a is fixed on one end to a respective base 32 and on the other end to a respective support rod 28. The base 32 provides a fixed surface for the biasing member 24a to push off of so as to urge the support rod 28 away from the elongated support 34. Accordingly, it should be appreciated that the base 32 and the support rods 28 are made of a durable and rigid material such as steel.

In operation, the biasing member 24a is free to urge the spoke 16 into the first position. However, upon experiencing a predetermined centrifugal force, the first and second parts 20, 22 are urged towards the rim 14, but cannot as the respective proximal ends 20a, 22a of the first and second part 22 are disposed between the hub 12 and the rim 14. The predetermined centrifugal force may be determined by the dimensions of the spokes 16 and the openings 18 and at what speed the spokes 16 visually appear to be a solid disk 26, or in other words the speed at which the individual openings 18 are no longer visually recognizable.

Figure 3:
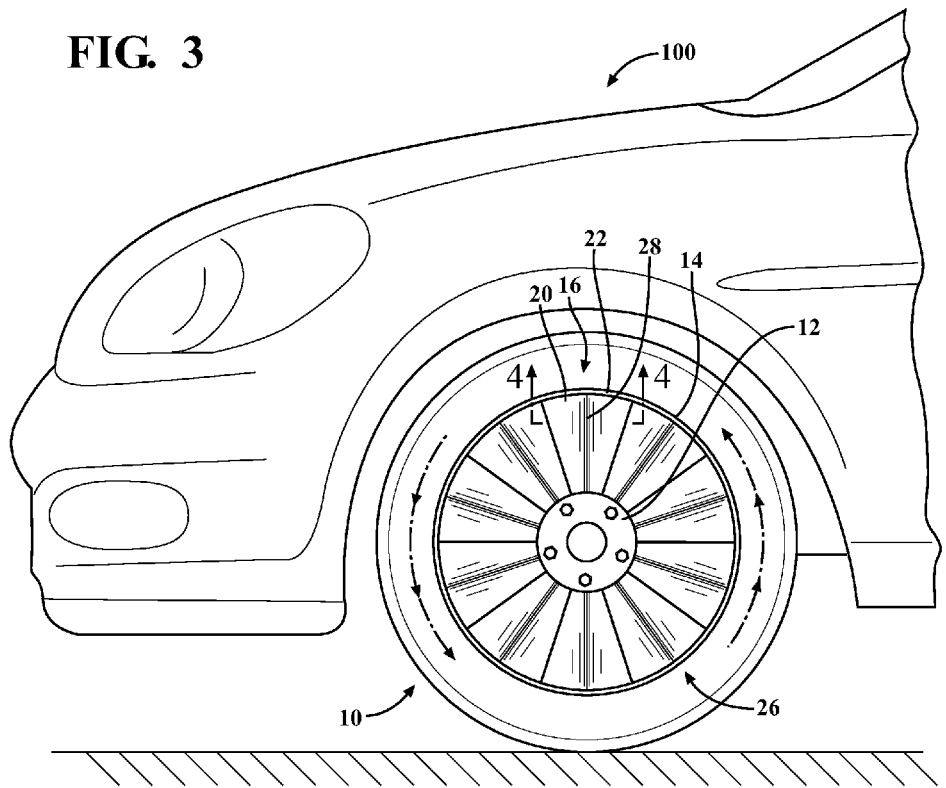
FIG. 3 is a perspective view showing the wheel assembly with the spokes closing the openings.

The centrifugal force is thus translated onto the biasing member 24a, pushing the first and second parts 20, 22 against the biasing member 24a. It should also be appreciated that air pressure from the movement of the automotive vehicle 100 also acts on the first and second parts 22, pushing the first and second parts 22 against the biasing member 24a. The centrifugal force and air pressure overcome the force of the biasing member 24a so as to move the spokes 16 into the second position as shown in FIGS. 3 and 4. The predetermined speed may be determined by the dimensions of the spokes 16 and the openings 18 and at what speed the spokes 16 visually appear to be a solid disk 26, or in other words when the openings 18 are no longer visually recognizable. Accordingly, wheel assembly 10 is configured to provide the aesthetic look of the spokes 16 yet the aerodynamic benefit of a disk 26.

With reference now to FIGS. 6-11, another aspect of the wheel assembly 10 is provided, wherein like elements are referenced by like numbers increased by 100. The wheel assembly 110 includes a base 132. The base 132 includes a plurality of elongated supports 34 extending radially from the hub 112 towards the rim 114 (shown in FIGS. 10 and 11). The wheel assembly 110 includes a carriage 36 slidably mounted to a respective elongated support 34. In particular the carriage 36 includes a channel 36a through which a respective elongated support 34 is slidably mounted.

The wheel assembly 10 includes a link 38. The link 38 cooperates with the biasing member 124 (shown as a helical spring 124a) to move the spoke 116 between the first and second positions. In particular, the link 38 pulls the first and second parts 120, 122 down towards the elongated support 134 so as to flatten the spoke 116 as shown in FIGS. 9 and 11, and pushes the spoke 16 upwardly so as to create the openings 118 between the outer side edge 120d, 122d of respective first and second parts 120, 122 as shown in FIGS. 8 and 10.

In one illustrative example, a first end of the link 38 is pivotably attached to the inner side edge 120,c 122c of both the first and second parts 120, 122 and a second end pivotably attached to the carriage 36. However, it should be appreciated that the first end of the link 38 may be pivotably coupled to the support rod 128. The biasing member 124 is configured to continuously pull the base 132 towards the hub 112. Accordingly, a predetermined centrifugal force of the rotating wheel assembly 110 urges the carriage 36 away from the hub 112 towards the rim 114 so as to move the outer side edge 120d, 122d of the first and second parts 120, 122 towards each other. When the centrifugal force is below the predetermined amount, the force of the biasing member 124a is sufficient to pull the base 132 towards the hub 112, pushing the link 38 upwardly so as to move the spoke 116 into the first position.

As shown in FIGS. 10 and 11, the elongated support 134 is an elongated rod. Thus, the channel 36a is a generally elongated so as to slidingly fit the elongated support 134. Each of the elongated supports 34 further includes a spring support 40. The spring support 40 is configured to hold a proximal end of the biasing member 124a in a fixed relationship with the elongated support 134. The distal end of the biasing member 124a is attached to the carriage 36. The carriage 36 is disposed between the rim 114 and the spring support 40.

In operation, the biasing member 124 is free to pull the carriage 36 towards the hub 112, which in turn pulls one end of the link 38 towards the hub 112 and pushes the other end of the link 38 away from the elongated support 134 placing the spoke 116 in the first position. When the wheel assembly 110 is subjected to a predetermined centrifugal force, the force of the biasing member 124a is overcome and the carriage 36 is moved away from the hub 112, carrying with it the distal end of the link 38. As the distal end of the link 38 is moved towards the rim 114, the elongated support 134 is pulled down placing the spoke 116 in the second position. The predetermined centrifugal force may be determined by the dimensions of the spokes 116 and the openings 118 and at what speed the spokes 116 visually appear to be a solid disk 126, or in other words when the openings 118 are no longer visually recognizable. Accordingly, wheel assembly 110 is configured to provide the aesthetic look of the spokes 116 yet the aerodynamic benefit of a disk 126.

With reference now to FIGS. 12-15, another aspect of the wheel assembly 10 is provided, wherein like elements are referenced by like numbers increased by 200. The actuator 224 is a servo motor 224b. The wheel assembly 210 further includes a sensor 42 and a controller 44. The sensor 42 is configured to detect the relative speed of the wheel assembly 210. The controller 44 receives the relative speed of the wheel assembly 210 so as to move the spoke 216 between the first position and the second position. In particular, the controller 44 positions the spoke 216 in the first position when the relative speed of the wheel assembly 10 is below a predetermined speed, and positions the spoke 216 assembly in the second position when the relative speed of the wheel assembly 10 is above a predetermined speed. The predetermined speed may be determined by the dimensions of the spokes 216 and the openings 218 and at what speed the spokes 216 visually appear to be a solid disk 226, or in other words when the openings 218 are no longer visually recognizable.

The servo motor 224b may be mounted to the carriage 36 so as to move the link 38 axially along the elongated support 34. When the relative speed is below a predetermined speed, the servo motor 224b moves the carriage 236 to a first position as shown in FIG. 14. Accordingly, the wheel assembly 210 presents the aesthetic look of the spokes 216. When the relative speed is above the predetermined speed, the servo motor 224b moves the carriage 36 to a second position as shown in FIG. 15. Accordingly, the spokes 216 form a disk 226 which improves the aerodynamic performance of the wheel assembly 210. Accordingly, wheel assembly 10 is configured to provide the aesthetic look of the spokes 16 yet the aerodynamic benefit of a disk 226 based upon relative speed.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. A wheel assembly for use in an automotive vehicle, the wheel assembly configured to improve the aerodynamics of an automotive vehicle, the wheel assembly comprising:
a hub and a rim;
a plurality of spokes extending radially from the hub and interconnected to the rim, each of the plurality of spokes spaced apart from each other so as to define a plurality of openings, each of the plurality of spokes having a first part hingedly connected to a second part about a support rod, the support rod extending along a radial axis of the hub and spaced apart from a plane of the hub; and
an actuator mechanically attached to the support rod of each of the plurality of spokes, the actuator configured to move the support rod towards the hub so as to position the rod closer to the plane of the hub and spread the first part and the second part away from each other so as to cover each of the plurality of openings and form a generally solid disk when the wheel assembly reaches a predetermined speed so as to improve the aerodynamics of the automotive vehicle.

2. The wheel assembly as set forth in claim 1, wherein each of the plurality of spokes is movable from a first position to a second position, wherein first part is a planar member and the second part is a planar member, the first part is pivotably connected to the second part, the first part is angled with respect to the second part so as to form a generally "V" shaped cross-section, wherein in the first position the first and second part positioned with respect to each other to form the "V" shaped cross-section with the plurality of openings are disposed therebetween, and in the second position the first and second part are flattened so as to close the plurality of openings.

3. The wheel assembly as set forth in claim 2, wherein the first part and the second part each include a distal end opposite a proximal end, and an inner side edge opposite of an outer side edge and extending between the distal and proximal ends so as to define an isosceles trapezoid, wherein the distal end of the first part and second part are disposed adjacent the hub and the inner side edge of the first part is pivotably coupled to the inner side edge of the second part.

4. The wheel assembly as set forth in claim 3, wherein the actuator is configured to urge the outer side edge of the first part towards the outer side edge of the second part.

5. The wheel assembly as set forth in claim 4, wherein the actuator is a servo motor.

6. The wheel assembly as set forth in claim 5, further including a sensor and a controller, the sensor configured to detect a relative speed of the wheel assembly, the controller actuating the servo motor so as to move the outer side edge of the first and second part towards each other when the relative speed of the wheel assembly reaches a predetermined speed, and wherein the controller is further configured to move the outer side edges of the first and second part away from each other when a speed of the wheel assembly is below the predetermined speed.

7. The wheel assembly as set forth in claim 4, wherein the actuator is a biasing member.

8. The wheel assembly as set forth in claim 7, further including a base, the base having a plurality of elongated supports extending radially from the hub, a carriage slidably mounted to the base, and a link having a first end pivotably attached to the inner side edge of both the first and second part and a second end pivotably attached to the carriage, the biasing member configured to continuously pull the carriage towards the hub, wherein a predetermined centrifugal force generated by a rotation of the wheel assembly urges the carriage away from the hub so as to move the outer side edges of the first and second part towards each other.

9. The wheel assembly as set forth in claim 8, wherein each of the plurality of elongated supports is an elongated rod.

10. The wheel assembly as set forth in claim 9, wherein the carriage includes a channel the elongated rod disposed within the channel.

11. The wheel assembly as set forth in claim 9, wherein each of the plurality of elongated supports further includes a spring support, wherein the biasing member is fixedly attached to the spring support on one end and is fixedly attached to the carriage on the other end, the carriage disposed between the rim and the spring support.

12. The wheel assembly as set forth in claim 7, wherein the biasing member is a helical spring.

13. The wheel assembly as set forth in claim 7, further including a plurality of support rods extending radially from the hub, wherein the first part and the second part include a sleeve disposed along the inner side edge, the sleeve mounted to a respective one of the plurality of support rods so as to allow the first part to pivot with respect to the second part about the respective on of the plurality of support rods.

14. The wheel assembly as set forth in claim 13, further including a base, the biasing member fixed on one end to the base and on the other end to a respective plurality of support rods.

15. The wheel assembly as set forth in claim 14, wherein the plurality of support rods and the plurality of elongated supports are made of a durable and rigid material.

16. The wheel assembly as set forth in claim 15, wherein durable and rigid material is steel.

* * * * *